(12) United States Patent
Neuman

(10) Patent No.: US 8,706,277 B2
(45) Date of Patent: Apr. 22, 2014

(54) METHOD AND SYSTEM FOR MEMORY USAGE IN REAL-TIME AUDIO SYSTEMS

(75) Inventor: Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 482 days.

(21) Appl. No.: 12/969,715

(22) Filed: Dec. 16, 2010

(65) Prior Publication Data

US 2011/0087487 A1 Apr. 14, 2011

Related U.S. Application Data

(62) Division of application No. 11/011,566, filed on Dec. 14, 2004, now abandoned.

(60) Provisional application No. 60/546,796, filed on Feb. 23, 2004.

(51) Int. Cl.
*G06F 17/00* (2006.01)
*H03M 7/00* (2006.01)
*G10L 19/00* (2013.01)
*G10L 21/00* (2013.01)

(52) U.S. Cl.
USPC ............................... 700/94; 341/106; 704/501

(58) Field of Classification Search
CPC ...................... G11B 20/00007; G11B 20/1251; G11B 20/10527; H04B 1/665; H04B 1/66; H04B 1/667
USPC ................. 700/94; 341/106; 706/21; 704/501
See application file for complete search history.

(56) References Cited

U.S. PATENT DOCUMENTS

| 5,835,030 | A | 11/1998 | Tsutsui et al. |
| 6,813,372 | B2* | 11/2004 | Standridge et al. ........... 382/107 |
| 7,162,419 | B2* | 1/2007 | Ojanpera ...................... 704/501 |
| 2002/0122658 | A1* | 9/2002 | Fukuda et al. .................. 386/95 |
| 2004/0030547 | A1* | 2/2004 | Leaning et al. ................ 704/211 |
| 2004/0044534 | A1* | 3/2004 | Chen et al. ..................... 704/501 |

OTHER PUBLICATIONS

Wiegand, Thomas et al., "Overview of the H.264/AVC Video Coding Standard"; Jul. 2003; IEEE Transactions on Ciruits and Systems for Video Technology, vol. 13, No. 17, all pages.*

* cited by examiner

*Primary Examiner* — Jesse Elbin
(74) *Attorney, Agent, or Firm* — Thomas|Horstemeyer, LLP.

(57) ABSTRACT

System and method for encoding, transmitting and decoding audio data. Audio bit steam syntax is re-organized to allow system optimizations that work well with memory latency and memory burst operations. Multiple small entropy coding tables are stored in RAM and loaded to on-chip memory as needed. Audio prediction is pipelined in the bitstream syntax. Intra frames, independent of other frames in the bitstream, are included in the bitstream for error recovery and channel change. New algorithms are implemented in legacy syntax by including the new information in the user data space of the audio frame. The new decoder can use projection to determine where the new information is and read ahead in the stream. Audio prediction from the immediately previous frame is restricted. Audio prediction is performed across channels within a single audio frame. A variable re-order function comprises storing channels of data to DRAM in the order they are decoded and reading them out in presentation order.

16 Claims, 16 Drawing Sheets

METHOD AND SYSTEM FOR MEMORY USAGE IN REAL-TIME AUDIO SYSTEMS

CROSS-REFERENCE TO RELATED APPLICATIONS/INCORPORATION BY REFERENCE

This patent application is a divisional of U.S. patent application Ser. No. 11/011,566 filed Dec. 14, 2004, which claims priority to U.S. Provisional Patent Application 60/546,796, filed Feb. 23, 2004, the subject matter of each of which is hereby expressly incorporated herein by reference.

FIELD OF THE INVENTION

Certain embodiments of the invention relate to audio processing. More specifically, certain embodiments of the invention relate to a method and system for memory usage in real-time audio systems.

BACKGROUND OF THE INVENTION

Some of today's audio systems are developed for embedded processing in devices such as set-top boxes, digital versatile disk (DVD) players, camcorders, portable audio players, and so on. All of these systems rely on low-cost hardware decoders or low-cost digital signal processors (DSP). A major factor that affects the cost of any audio processing system is memory demands such as memory bandwidth. In simple audio-only applications, for example, there may be minimal memory consumption requirements, and in high-end set-top boxes, for example, there is a need for a large number of different functions to share memory bandwidth and share memory space. Optimizing the usage of memory space and memory bandwidth often results in large system cost savings. Savings in memory bandwidth may further be improved by incorporating improvements to audio bit stream syntax definition, and improvements to audio decoder architectures. Working with real limits of memory is critical, since as dynamic random access memory (DRAM) speeds rise, there is a corresponding increase in DRAM response time. RAS and CAS signals overhead, page break delays, and/or physical timing constraints of dual data rate RAM (DDR) systems may cause increased delay in the response time of DRAM devices. Although there is a simultaneous increase in the speeds of DRAMs, which results in larger amounts of DRAM data, the resulting DRAM data is very bursty in nature. It is desirable to have DRAMs with much longer burst periods, separated by longer access data delays.

For example, today's DDR technologies require a minimum burst length of 2 words. On a system bus width of 32 bits, this results in a minimum burst size of 8 bytes. Better bandwidth efficiency may be achieved by designing with a burst length of 4, since this may allow command functions to occupy the bus during DRAM burst accesses. A burst length of 4 would result in a burst of 16 bytes. Additional efficiency may be gained by increasing the burst size, since the RAS and page break overhead is usually 8 cycles. To achieve 50% efficiency would require a burst length of, for example, 16, or 64 bytes. To achieve an efficiency of 75% would require a burst length of 48, which would return 192 bytes. High-end systems such as processing systems with high functionality will require very high DRAM efficiency, which may be achieved through much longer burst lengths.

When coupled with real-time systems having a plurality of clients, each client must have the capability to take turns in accessing the DRAM resources. In such real-time systems having a plurality of clients, the clients are required to request more data to process, in order that the client may adequately tolerate the wait time consumed by other clients in the system. This also increases the burst size demanded by clients such as audio processing clients. However, this does not work well with certain types of audio syntax, audio systems, and/or audio decoder operations.

Furthermore, today's modern CPU architectures rely heavily on cache based subsystems. The CPU cache typically requests data from memory only as it is needed. As a result, the CPU must often wait for a period of time starting from a time instant when the request is made and ending a time instant when the data is returned from memory. Accordingly, this does not provide an optimal manner for processing.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for memory usage in real time audio systems.

One embodiment of the present invention is directed to a method of encoding a data stream. According to the method, a plurality of code tables are maintained, each code table implementing a different coding scheme. A data stream is received and it is determined which of the plurality of code tables would encode the data stream most efficiently. The data stream is encoded using the code table determined to encode the data stream most efficiently.

Another embodiment of the present invention is directed to a method of decoding a data stream in a system comprising a data processor. According to the method, a plurality of code tables are stored in memory external to the data processor, each of the code tables implementing a different coding scheme. An encoded data stream is received. An appropriate code table is loaded from the external memory to a memory module in the data processor based on the coding scheme used to encode the encoded data stream. The encoded data stream is decoded using the code table loaded to the memory module in the data processor.

Another embodiment of the present invention is directed to a method of processing media data. Pursuant to the method, prediction is performed on a first clip of media data to produce a media frame comprising a reference to a previous media clip and difference data representing a difference between the first clip and the previous clip. The media frame is transmitted and then received at a decoder, which decodes the difference data. Stored prediction data referred to by the reference is accessed, the prediction data representing said previous media clip. The decoded difference data is added to the stored prediction data to produce data representing the first media clip. According to an illustrative embodiment of the present invention, first media clip and the previous media clip are each at least 256 bytes in size.

Another embodiment of the present invention is directed to a method of transmitting media data. According to the method, a difference value between a first media clip and a previous media clip is determined. A reference to the previous media clip is transmitted. The difference value is transmitted after transmitting the reference.

Another embodiment of the present invention is directed to a method of decoding media data. Pursuant to the method, a reference to a previous media clip is received. Data corresponding to the previous media clip is retrieved from memory. After receiving the reference, difference data corresponding to a first media clip is received. The difference data is decoded. At least a portion of said retrieving takes place substantially in parallel with at least a portion of said decoding. The data retrieved from memory is added to the decoded difference data to produce a decoded value corresponding to the first media clip.

Another embodiment of the present invention is directed to a method of transmitting media data. Pursuant to the method, prediction is utilized wherein transmitted media data frames include a difference value between a first media clip and a previous media clip and further include a reference to the previous media clip. An intra media data frame is periodically transmitted wherein all of the data needed to decode the intra frame is included in said intra frame, and wherein no frames transmitted after the intra frame refer to frames transmitted prior to the intra frame.

Another embodiment of the present invention is directed to a method of transmitting and processing media data. According to the method, media data corresponding to said first media standard is included in a media data portion of a media data frame structured according to a first media standard. Media data corresponding to a second media standard is included in a user data portion of the media data frame structured according to said first media standard. The media data in the media data portion of the frame is decoded according to the first media standard. The media data in the user data portion of the frame is decoded according to the second media standard.

Another embodiment of the present invention is directed to a method of transmitting a media data stream comprising media data frames. Pursuant to the method, prediction is utilized, wherein transmitted media data frames include a difference value between a first media clip and a previous media clip and further include a reference to the previous media clip. Frames are restricted from utilizing prediction based upon the immediately preceding frame. In an alternative embodiment, frames are restricted from utilizing prediction based upon the immediately preceding two frames.

Another embodiment of the present invention is directed to a method of transmitting audio data. Pursuant to the method, a difference value between a first audio clip of a first audio channel and a previous audio clip of a second audio channel is determined. A reference to the previous audio clip of the second audio channel is transmitted, and the difference value is transmitted.

Another embodiment of the present invention is directed to a method of decoding a first audio clip of a first audio channel. According to the method, a reference to a previous audio clip of a second audio channel is received. Difference data indicating a difference value between the first audio clip and the previous audio clip is received. Previous clip data, referred to by the reference, is retrieved from memory. The difference data is decoded. The previous clip data is added to the decoded difference data to produce a decoded value corresponding to the first audio clip.

Another embodiment of the present invention is directed to a method of transmitting audio data. Pursuant to the method, a difference value between a first audio clip of a first audio channel and a second audio clip of a second audio channel is determined, the first and second audio clips being part of a single audio data frame. A reference to the second audio clip of the second audio channel is transmitted, and the difference value is transmitted.

Another embodiment of the present invention is directed to a method of decoding a first audio clip of a first audio channel. According to the method, a reference to a second audio clip of a second audio channel is received, the first and second audio clips being part of a single audio data frame. Difference data indicating a difference value between the first audio clip and the second audio clip is received. Data corresponding to the second audio clip, referred to by the reference, is retrieved from memory. The difference data is decoded. The retrieved second audio clip data is added to the decoded difference data to produce a decoded value corresponding to the first audio clip.

Another embodiment of the present invention is directed to a method of transmitting audio data corresponding to a first audio clip of a first audio channel. According to the method, a second audio clip of a second audio channel is phase shifted. A difference value between said first audio clip of said first audio channel and the phase-shifted second audio clip of said second audio channel is determined. A reference to the second audio clip of said second audio channel is transmitted, and the difference value is transmitted.

Another embodiment of the present invention is directed to a method of decoding a first audio clip of a first channel. According to the method, a reference to a second audio clip of a second audio channel is received. Difference data indicating a difference value between the first audio clip and the second audio clip is received. Phase shift data indicating a difference in phase between the first audio clip and the second audio clip is received. Previous clip data, referred to by the reference, is retrieved from memory. The second clip data is phase-shifted by an amount indicated by the phase shift data. The difference data is decoded. The phase-shifted second clip data is added to the decoded difference data to produce a decoded value corresponding to the first audio clip.

Another embodiment of the present invention is directed to a method of decoding audio data. Pursuant to the method, intra-frame, inter-channel prediction is performed to determine decoded values of a plurality of audio clips corresponding to a plurality of channels based on decoded values of other audio channels within the same audio data frame. The audio clips are decoded in channel order. The decoded values for the plurality of audio clips are stored in memory in the order they are decoded. The decoded values for the plurality of audio clips are read from memory in an order of presentation.

These and other advantages, aspects and novel features of the present invention, as well as details of an illustrated embodiment thereof, will be more fully understood from the following description and drawings.

DETAILED DESCRIPTION OF THE INVENTION

Figure 1:
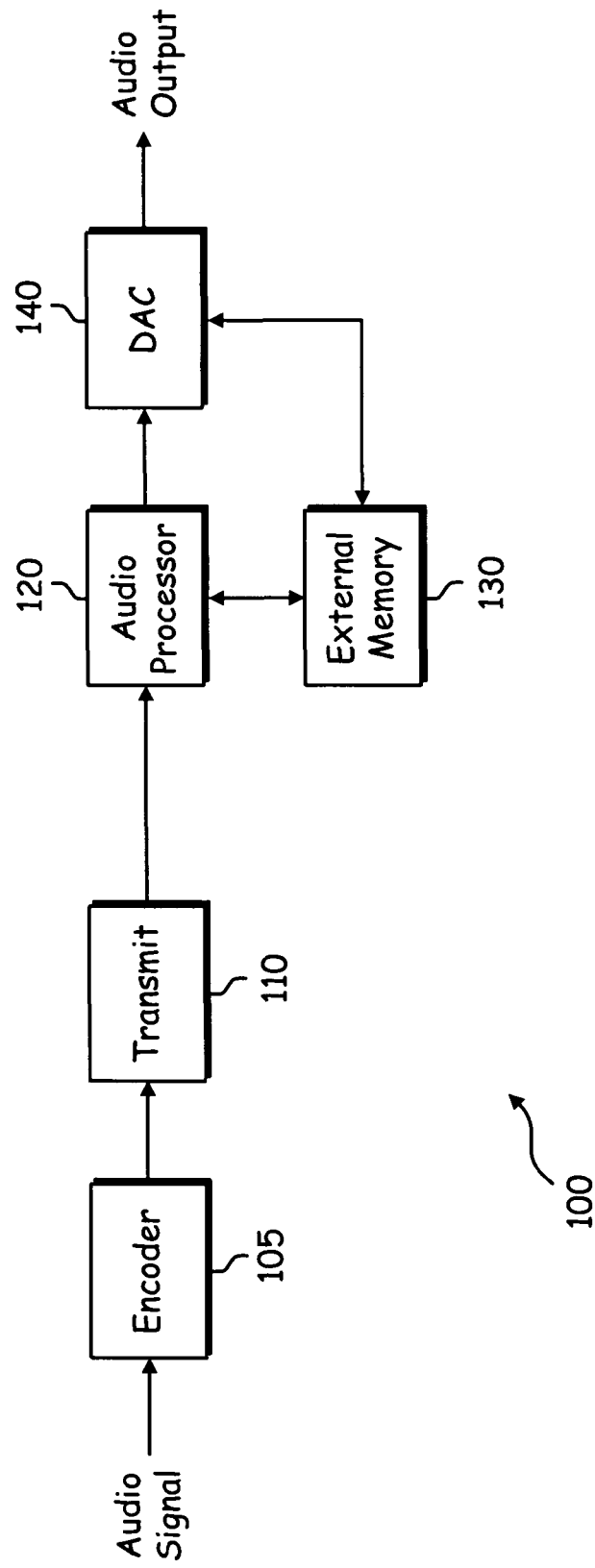
FIG. 1 is a functional block diagram representing a system for encoding, transmitting and decoding audio data according to an illustrative embodiment of the present invention.

Certain embodiments of the invention may be found in a method and system for memory usage in real time audio systems.

Rather than requesting data from memory only when it is needed, an aspect of the invention utilizes a more efficient system and method that takes advantage of improvements in the bit stream, and pre-fetches data well in advance of when it is needed. This allows a CPU to more efficiently process data in a bit stream.

In another aspect of the invention, audio bit steam syntax may be re-organized to allow system optimizations that work well with memory latency, and memory burst operations. Most modern audio algorithms utilize high-level functions such as entropy or arithmetic coding, quantization and bit allocation, frequency transforms, and audio prediction. These algorithm functions may be utilized by DRAM in order to avoid short latency requirements, and to avoid short-data burst (low efficiency) DRAM accesses. These high-level functions may include various methods for avoiding short latency and data bursts.

These methods may comprise providing entropy coding table grouping in DRAM and utilizing large-size audio prediction from historical audio frames. Pipelining may be utilized in the syntax to relieve DRAM latency requirements. Accordingly, all DRAM information may be provided far in advance of when it may be required for processing. Intra-frames may be included in the bit stream syntax to allow for independent frames for error recovery and channel change. Legacy syntax may include new algorithms by including the new information in user data space of the audio frame. A new decoder may be adapted to use projection to determine where the new information is located and read-ahead in the stream based on the determined location. Alternatively, the new syntax may be defined such that new audio information is included, for example, one (1) frame prior to the decoding of legacy syntax to allow time for DRAM accesses in any new compression schemes. Write-back delay is critical to any real-time DRAM system and just like reads, DRAM writes may also have long latencies. As a result, any use of prediction should bar prediction from an immediately previous frame, since the immediately previous frame may not yet be available in DRAM. Audio prediction may occur across historical channels, or across channels within the current audio frame. If the prediction happens within a frame, it is often difficult to allow for prediction latency from DRAM. To prevent this, all intra-frame prediction channels may be stored on-chip. This may necessitate keeping the frame-channel size small to allow for efficient on-chip storage in real decoders. The use of intra-frame prediction creates other problems, namely that the data is decoded in channel order, and needs to be presented to a DAC in sample order with all channels being simultaneously processed. A variable reorder function may be implemented in which channels of data may be stored to DRAM in the order they are decoded, and are read out in the order of presentation. Small bursts may occur across all channels for use in parallel at the DAC.

FIG. 1 is a functional block diagram representing a system 100 for encoding, transmitting and decoding audio data according to an illustrative embodiment of the present invention. The system includes an encoder 105, a transmit block 110, an audio processor 120, external memory 130 and digital-to-analog converter (DAC) 140. The encoder 105 receives an audio signal and encodes a digital audio stream for transmission. The encoding process may include compressing the audio data for more efficient transmission of data. In various embodiments of the present invention, data compression may include performing audio prediction on the audio signal to decrease the amount of data that needs to be transmitted to represent the audio signal, as will be further described in detail below. The encoded data is then transmitted by the transmit block 110. The audio processor 120 decodes and decompresses the transmitted audio data stream and provides the decoded audio data to the digital-to-audio converter 140 to convert the digital audio signal into an analog audio signal. In an illustrative embodiment of the present invention, the audio processor 120 comprises an integrated circuit chip that includes a microprocessor, on-chip memory such as RAM, and, in some embodiments, various audio accelerators and/or co-processors. The external memory 130 illustratively comprises DRAM. In certain embodiments of the present invention, audio data decoded by the audio processor 120 may be stored in external memory 130 and then read from external memory 130 to the DAC 140.

For purposes of clarity and demonstration, the present invention is described herein with respect to audio data. However, it is to be understood that the present invention applies also to other forms of media data such as video data.

Figure 2:
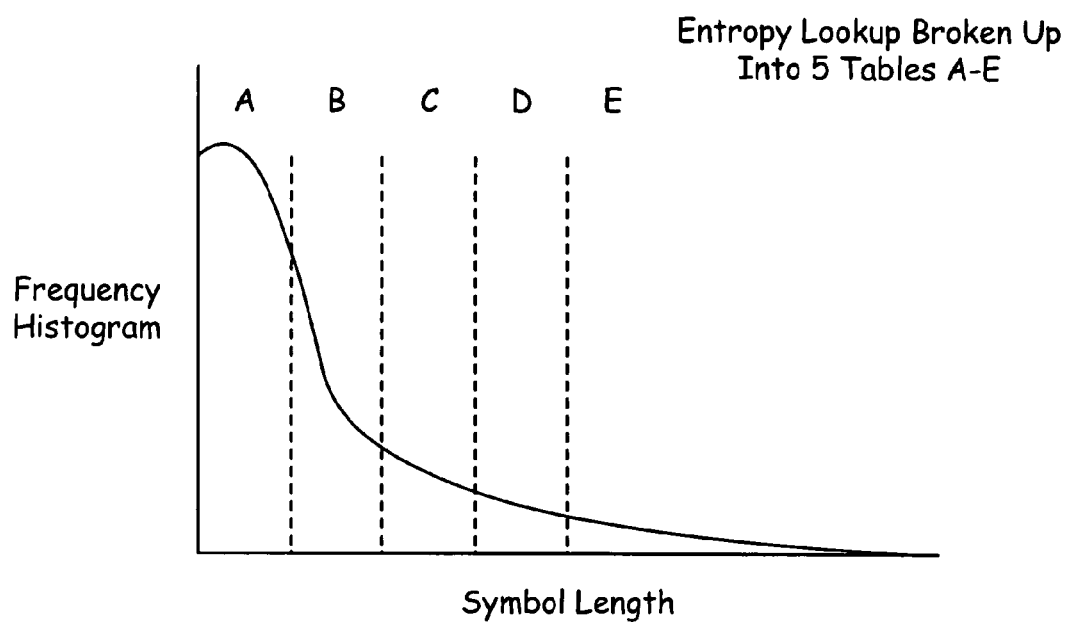
FIG. 2 is a frequency histogram demonstrating the frequency of occurrence of audio symbols relative to the symbol length according to an illustrative embodiment of the present invention.

According to an illustrative embodiment of the present invention, entropy coding is employed to compress the transmitted audio data. Entropy coding is a coding scheme that assigns codes to symbols so as to match code lengths with the probabilities of the symbols. The most common symbols are assigned the shortest codes. The Entropy coding function may rely on a plurality of coding schemes that may utilize lookup table functions to decode bit streams. Although large entropy tables may increase decoder efficiency, storing large on-chip lookup tables may be very costly if the table sizes are larger than a few kilobytes. Storing the data in DRAM 130 may be an effective solution, but the access times for DRAM may not be fast enough to accommodate needs of real-time processing systems. Entropy decoding in audio decoders may slow significantly when the system waits for DRAM access times. Additionally the lookup process is inefficient since a single word is usually addressed in memory, and this cannot take advantage of memory burst capability. In an illustrative embodiment of the present invention, these problems are solved by pre-fetching entropy tables from DRAM 130 into local on-chip memory. In an illustrative embodiment, the code tables are constructed in such a way that the code table is split into a plurality of smaller tables that are stored in DRAM 130. The decoder 120 is adapted to determine the appropriate code table and to load the contents of the appropriate table into on-chip memory, and use this smaller table multiple times for multiple lookups in the decoding process. FIG. 2 is a frequency histogram demonstrating the frequency of occurrence of audio symbols relative to the symbol length according to an illustrative embodiment of the present invention. FIG. 2 shows that entropy look-up is broken up into five tables A-E. Table A comprises the most frequently used symbols, that is, symbols of the shortest length. Table E comprises the least frequently used symbols, that is, symbols of the longest length. Tables B-D comprise symbols of intermediate occurrence frequency and symbol length.

Figure 3:
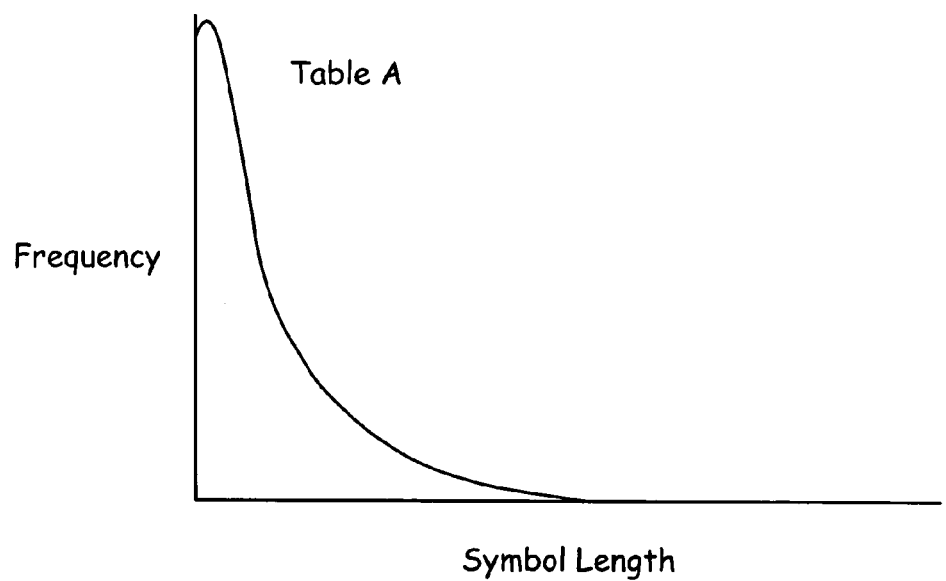
FIG. 3 is a frequency histogram demonstrating the frequency of occurrence of audio symbols relative to the symbol length for a first code table according to an illustrative embodiment of the present invention.
Figure 4:
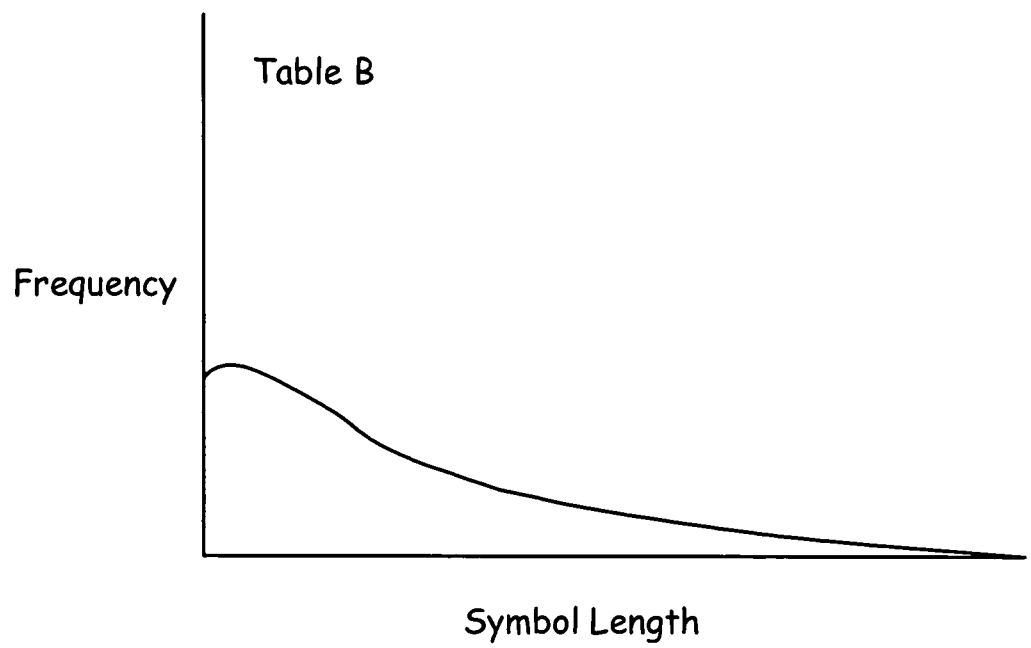
FIG. 4 is a frequency histogram demonstrating the frequency of occurrence of audio symbols relative to the symbol length for a second code table according to an illustrative embodiment of the present invention.

In one embodiment of the present invention, the encoder 105 maintains a plurality of code tables, each code table implementing a different coding scheme. When the encoder 105 receives an audio data stream to be encoded, it determines which of the plurality of code tables would encode the data stream most efficiently. The data stream is encoded using the code table determined to encode the data stream most efficiently. FIGS. 3 and 4 are frequency histograms for two exemplary code tables A and B. Code tables A and B implement different entropy coding schemes. Different audio frames may have different coding characteristics. If an audio frame contains a large number of small symbols, the encoder will use Table A to code the data. If an audio frame contains a smaller number of small symbols (and more long symbols) the encoder 105 will use Table B. Table A and Table B are smaller than the total combined table would be. The encoder 105 includes in each audio frame an indication of the coding scheme used. The different code tables are stored in external memory 130. The audio processor 120 fetches the indicated table from external memory 120, thus saving memory bandwidth when storing the table on-chip. By way of example, Tables A and B may implement the coding schemes as shown in the following tables:

TABLE A

| Data | Symbol |
| --- | --- |
| 1 | 1 |
| 2 | 011 |
| 3 | 010 |
| 4 | 0011 |
| 5 | 001011 |
| 6 | 001010 |
| 7 | 001001 |
| 8 | 001000 |
| Esc | 000111 (value) |

TABLE B

| Data | Symbol |
| --- | --- |
| 1 | 111 |
| 2 | 1101 |
| 3 | 1100 |
| 4 | 0111 |
| 5 | 0110 |
| 6 | 0101 |
| 7 | 0100 |
| 8 | 00111 |
| 9 | 00110 |
| 10 | 00101 |
| 11 | 00100 |
| Esc | 00011 (value) |

As can be seen, Table A uses much shorter symbols for values 1, 2 and 3 and can encode them more efficiently than Table B. However, the symbols 5, 6 and 7 are coded more efficiently in Table B. If a data stream has a very narrow concentration of values 1, 2 and 3 in high frequency, the encoder 105 will use Table A to encode the data stream. If a data stream has a wide distribution of values more evenly spread, the encoder 105 will use Table B. Note that Table B covers more data before resorting to an escape value. Table B is more efficient at coding the larger values.

Figure 5:
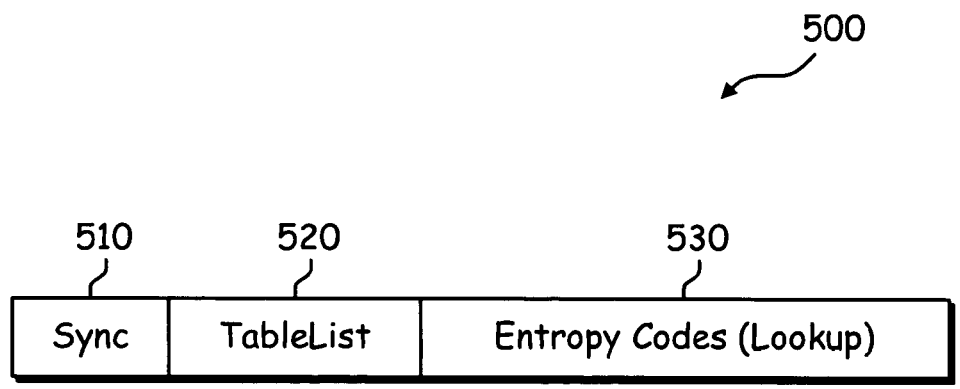
FIG. 5 is a diagram representing an audio frame syntax for implementing pipelining according to an illustrative embodiment of the present invention.
Figure 6:
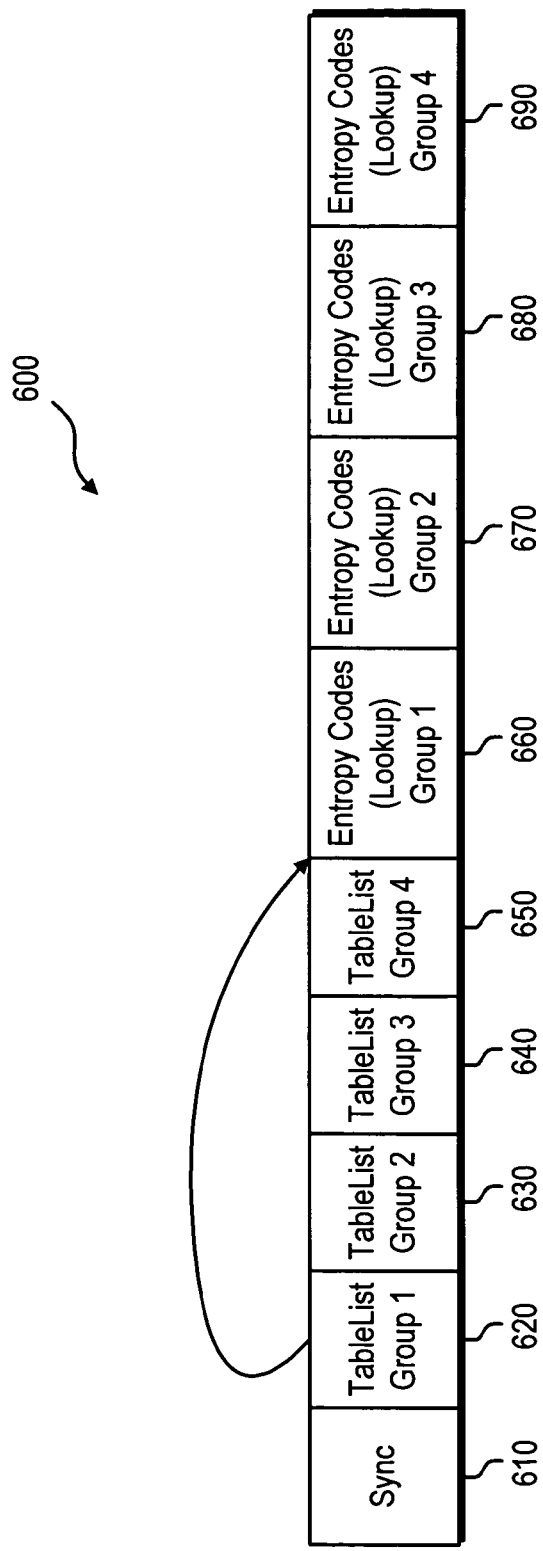
FIG. 6 is a diagram representing an audio frame syntax for implementing pipelining according to an illustrative embodiment of the present invention.

In this embodiment, a plurality of code tables are stored in memory 130 external to the data processor, each of the code tables implementing a different coding scheme. When an encoded data stream is received, an appropriate code table is loaded from the external memory 130 to a memory module in the data processor based on the coding scheme used to encode the encoded data stream. The encoded data stream is decoded using the code table loaded to the memory module in the data processor. In this way, the decoder 120 does not need to load both tables, and does not need to load a single larger table that covers both distributions ineffectively. In an illustrative embodiment of the present invention, the above described scheme is further improved by pre-loading the code tables to on-chip memory well in advance of when the bit stream decode and look-up needs to occur. Illustratively, an indication of which tables to pre-load is provided in the start of the frame syntax. Most of the decode functions are then performed from this set of tables. FIG. 5 is a diagram representing an audio frame syntax for implementing pipelining according to an illustrative embodiment of the present invention. Audio frame 500 includes a synchronization syntax element 510, a table list 520 and entropy codes 530. The synchronization syntax element 510 indicates the start of the frame. The table list 520 indicates which tables are needed for entropy codes or look-ups. For example, the decoder 120 may only need to load tables A and B for one frame. For a different frame, the decoder 120 may need to load tables C, D and E. In an illustrative embodiment of the present invention, the table list 520 is placed far in advance of the actual codes 530, to allow for more time for the decoder 120 to load tables from DRAM 130. FIG. 6 is a diagram representing an audio frame syntax for implementing pipelining according to an illustrative embodiment of the present invention. FIG. 6 is an example of a more heavily pipelined table pre-fetch. Audio frame 600 includes four table lists 620, 630, 640 and 650, each pertaining to a different group of entropy codes 660, 670, 680 and 690. By processing more data, and breaking the processing into groups, the syntax takes further advantage of pre-fetching tables for look-up purposes.

In another aspect of the present invention, the system 100 employs audio prediction to further reduce the amount of data that needs to be sent to represent a given clip of audio data. Prediction involves comparing current audio to previously decoded audio, and if there is a good match, the audio encoder 105 inserts a reference to the past audio clips into the current audio frame and encodes only a difference between the current audio clip and the previously coded clip, rather than encoding the entire current audio clip. The decoder 120 is adapted to receive the frame containing the previous clip reference and the coded difference information. The decoder decodes the difference data and fetches the previously decoded data referred to by the reference. The decoder then adds the decoded difference data to the previously decoded data for the previous clip to give a decoded representation of the current audio clip. Accordingly, much less audio information is transmitted, and much higher audio compression may be achieved. This may be particularly effective in, for example, music where single notes last a long period of time such as a few hundred milliseconds, and also for voice, where syllabic sounds last for milliseconds. In this regard, audio data comprises high redundancy over moderate time periods, for example, milliseconds to seconds. However, the prediction of past audio is usually done with storage of previous audio data in the decoder and in the encoder.

Figure 7:
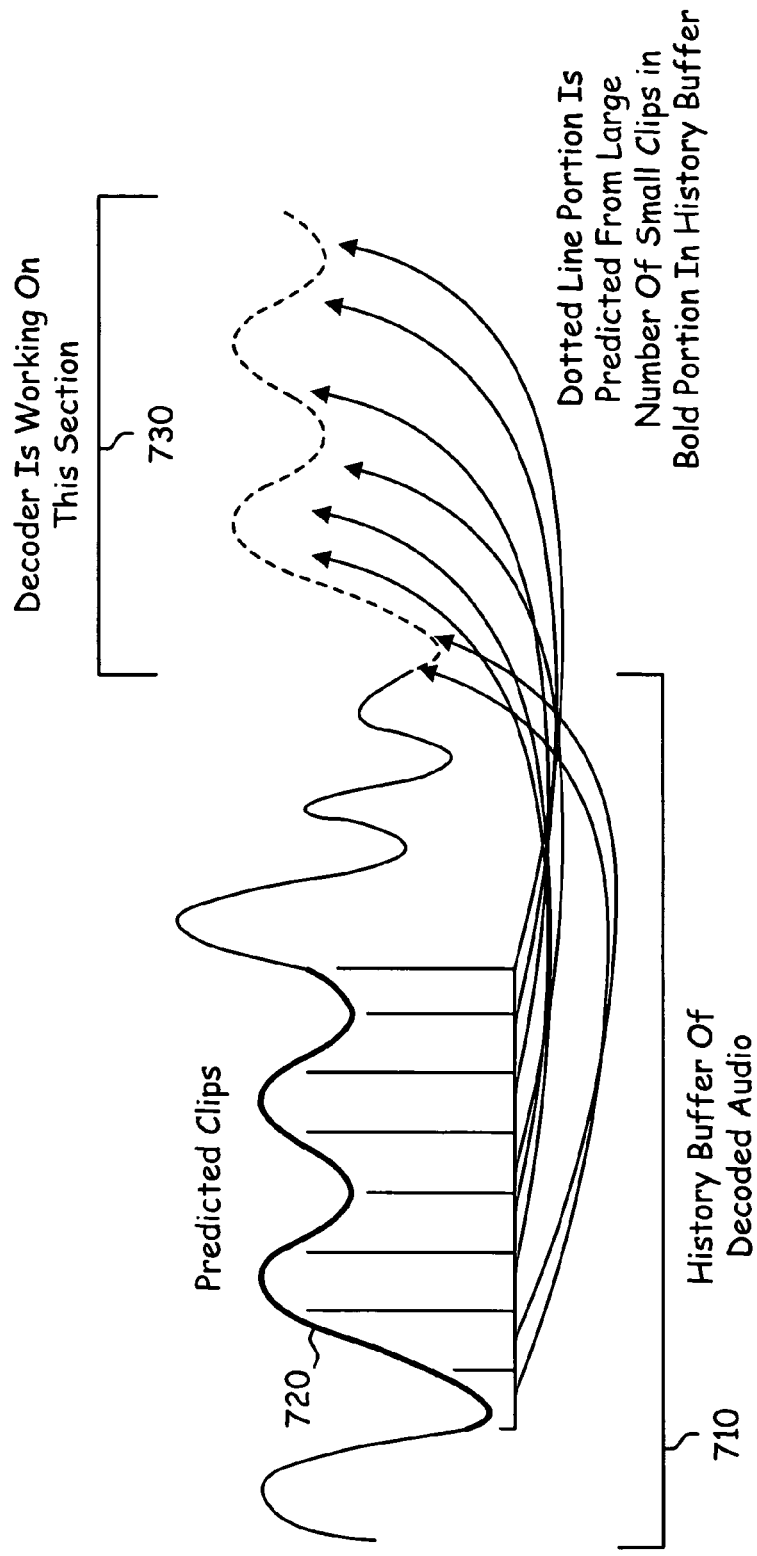
FIG. 7 is a diagram illustrating exemplary prediction of small segments of data, which may be utilized in connection with memory usage in real-time audio processing systems, in accordance with an embodiment of the invention.
Figure 8:
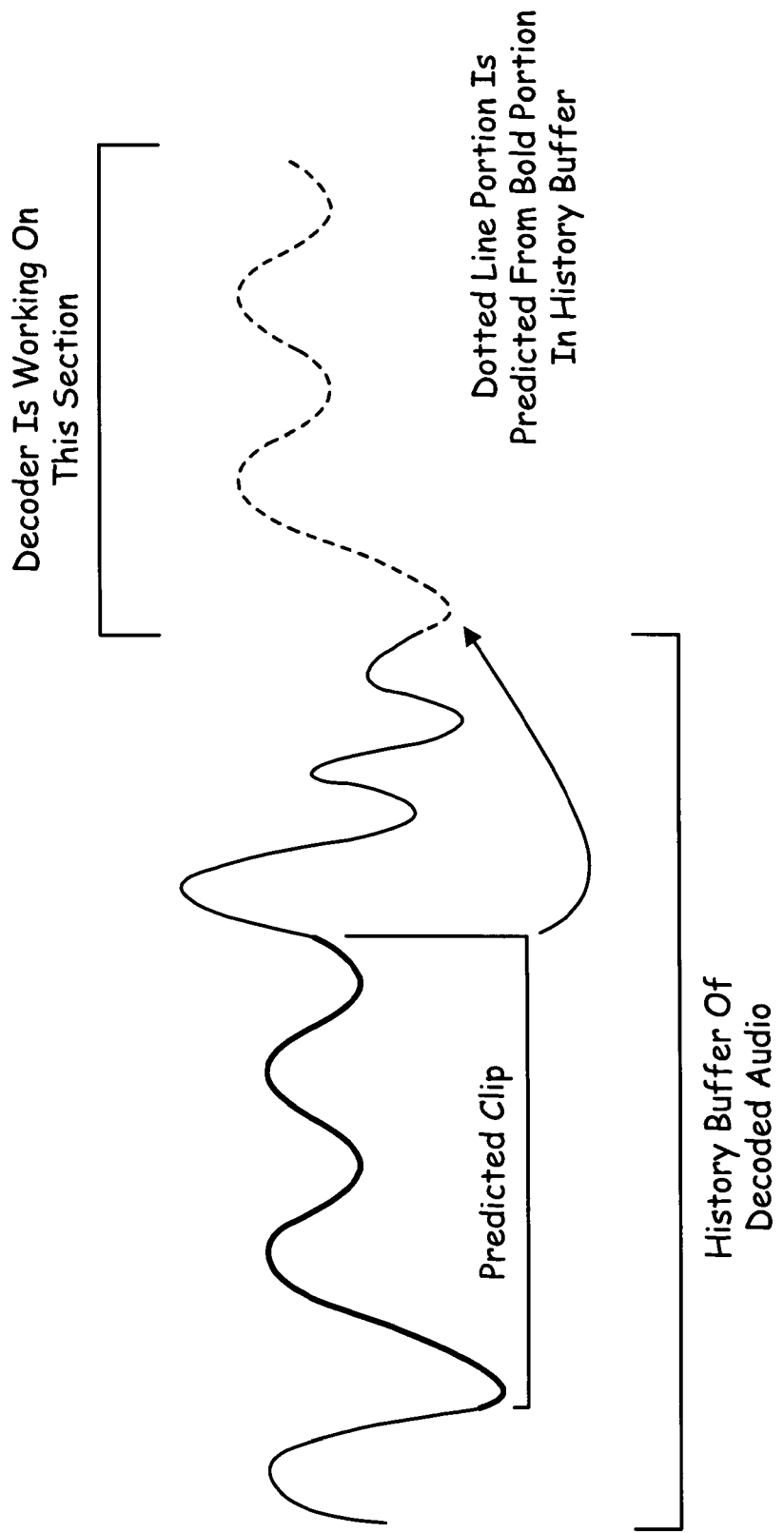
FIG. 8 is a diagram illustrating exemplary prediction of large segments of data, which may be utilized in connection with memory usage in real-time audio processing systems, in accordance with an embodiment of the invention.

If a large amount of historical audio data is needed for prediction, then this data is costly to store on-chip. Therefore, in an illustrative embodiment of the present invention, DRAM 130 is used for cost-efficient storage. As an example, 6-channel audio at 96 KHz that is sampled at a rate of 20 bits would consume 1.4 megabytes (Mb) of memory to one second of past audio. The quality of prediction may improve with a larger historical store of audio data. The efficiency of DRAM is related to the size of the prediction clips. Prediction of a large number of small clips makes poor use of DRAM because they are small in size and do not make optimal use of DRAM burst sizes. FIG. 7 is a diagram illustrating exemplary prediction of small segments of data, which may be utilized in connection with memory usage in real-time audio processing systems, in accordance with an embodiment of the invention. Audio segment 710 is stored in a history buffer in DRAM 130 and includes a plurality of small prediction clips 720. In order to predict the audio section 730, a large number of small prediction clips 720 are used, which overwhelms memory with a lot of small DRAM accesses, which lowers the efficiency of DRAM. The prediction of a few large clips of audio may make good use of bursts of data from DRAM since the large data size requires a lesser number of accesses than shorter data. FIG. 8 is a diagram illustrating exemplary prediction of large segments of data, which may be utilized in connection with memory usage in real-time audio processing systems, in accordance with an embodiment of the invention. Audio segment 810 is stored in a history buffer in DRAM 130 and includes a large prediction clip 820. In order to predict the audio section 830, a single large prediction clip 720 is used, which efficiently utilizes memory with long bursts. The prediction of a few large clips of audio may make good use of bursts of data from DRAM since the large data size requires a lesser number of accesses than shorter data. DRAM bursts are inefficient below 64 bytes, and are quite efficient at 256 bytes. In an illustrative embodiment of the present invention, the system 100 uses prediction clips of 256 bytes, which is about 64 samples of 32-bit audio data. In another embodiment, the system 100 uses prediction clips of at least 256 bytes.

Because of the nature of frequency transformed audio compression, it is often more efficient to predict frequency bins, from past audio frames given that the audio frequency bins are already available during the decode process. Further, in an illustrative embodiment of the present invention, the audio is run through a low-pass filter prior to prediction so that sensitivity to small, high frequency signal does not disrupt the prediction process. It is easier to find a predictive match if high-frequency noise is removed prior to searching for a match. Any error resulting between the predicted values and the desired values is coded and transmitted as frequency transformed difference data.

In an illustrative embodiment of the present invention, pipelining is employed in the audio frame syntax to significantly improve the system tolerance to DRAM latency. For example, if an algorithm needs to add prediction clips to a decoded fast Fourier transform (FFT) result, the syntax is optimized to indicate the location of the predicted clip before the FFT coefficients. In general, FFT coefficients and other elements in the stream may be entropy coded or arithmetically coded. The decoding of these elements takes time, and the syntax of these elements may comprise random lengths of symbols. This makes it difficult to determine where any specific symbol is located prior to decoding the bit stream. By placing memory prediction information in front of the other elements in the stream, the decoder may decipher memory prediction locations first. This allows the decoder 120 to fetch the prediction clips from memory 130 while the internal processing is decoding entropy codes and computing the FFT. The farther in advance the memory location is indicated, the more efficient the DRAM access. Pipelining may be adapted to occur, for example, one block of data in advance if there are multiple blocks per frame, or it may be adapted to occur, for example, one frame in advance.

Figure 9:
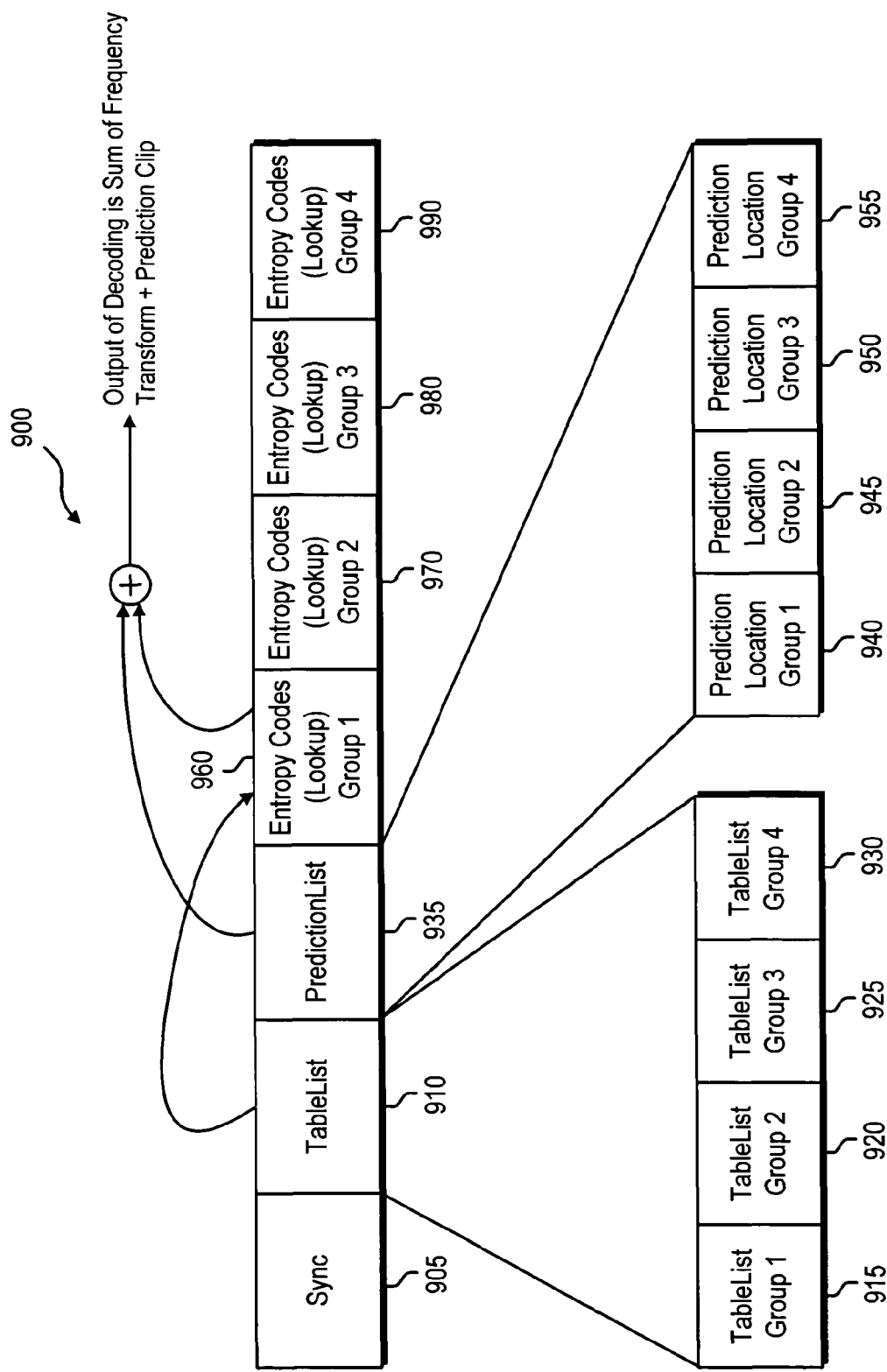
FIG. 9 is a diagram illustrating exemplary pipeline prediction, which may be utilized in connection with memory usage in real-time audio processing systems, in accordance with an embodiment of the invention.

FIG. 9 is a diagram illustrating an audio frame 900 employing pipeline prediction in accordance with an embodiment of the invention. Audio frame 900 includes four table lists 915, 920, 925 and 930, each of which indicate a table or group of tables required to entropy or syntax decode a different group of entropy codes 960, 970, 980 and 990. The prediction list 935 includes four prediction locations 940, 945, 950, 955, each of which indicates where in the history buffer the desired prediction "clip" of audio can be found for the corresponding entropy codes 960, 970, 980 and 990. In an illustrative embodiment of the present invention, this is indicated with sub-sample accuracy of a few thousand parts per sample in the time domain. In an alternative embodiment, the prediction location is indicated as a frequency bin in some previously decoded frame. These locations are pipelined in the syntax by placing the information ahead of when the data is needed. In a read system, the decoder 120 can start the fetch from DRAM 130 while it is performing entropy or syntax decode (look-up) and frequency transform of the residual, or difference, data. FIG. 9 is an example of a relatively heavily pipelined table pre-fetch. By processing more data, and breaking the processing into groups, the syntax can take further advantage of pre-fetching tables for lookup purposes.

Figure 10:
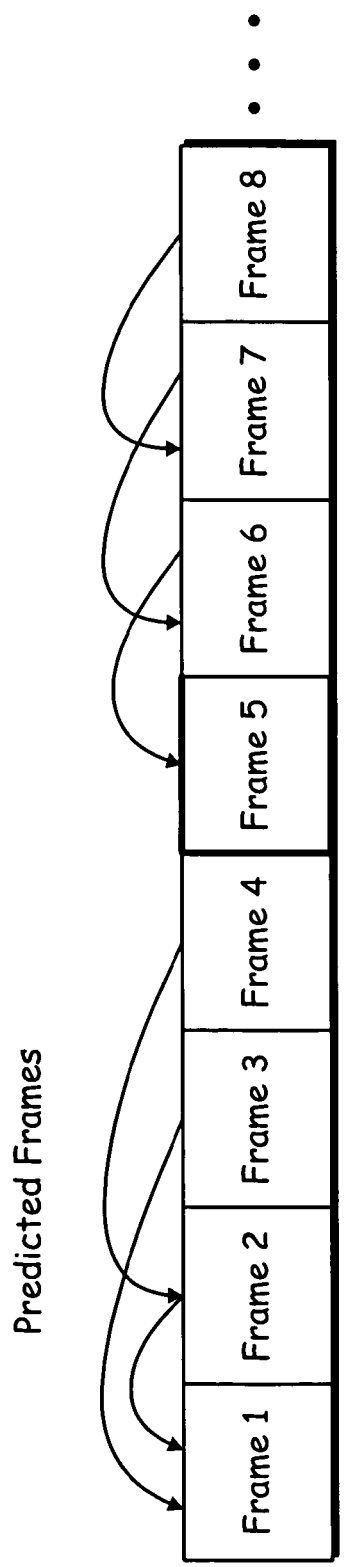
FIG. 10 is a diagram illustrating an exemplary intra-frame for error recovery, which may be utilized in connection with memory usage in real-time audio processing systems, in accordance with an embodiment of the invention.

FIG. 10 is a diagram illustrating an exemplary intra-frame for error recovery, which may be utilized in connection with memory usage in real-time audio processing systems, in accordance with an embodiment of the invention. Any system with prediction and pipelining implies that a single frame may not be decoded independently, but is dependent on previous frames. FIG. 10 shows a frame sequence 1000 that includes an intra frame 1010. Intra frame 1010 is a frame in the bit stream that does not depend on previous frames. It can be decoded independent of any past frame. The intra frame 1010 provides a random access point. This random access point may be utilized for channel change, and may allow the decoder 120 to recover from errors and restart decoding in the middle of a broadcast stream. Intra-frames in the bit stream facilitate decoding that is independent of any past frame. These frames do not perform prediction outside the frame, nor is any element of the frame broadcast in a previous frame. This allows channel change and random playback from any point in the data stream. The decoder 120 may simply discard all frames until an intra frame is found. Once the intra frame 1010 is found, the decoder may cleanly decode from that point onward. Referring to FIG. 10, if an error occurs in frames 1-4, the audio processor 120 must wait until frame 5 (the intra frame 1010) to restart decoding in order to recover from errors. Additionally, any channel change to this channel will result in the decoder 120 waiting until frame 5 to start decoding the new channel in order to avoid prediction from previous frames that happened prior to channel change. In an illustrative embodiment of the present invention, the audio data stream includes an intra frame at least every second in time, so that channel changes and error recovery happen within one second.

In another aspect of the present invention, the syntax of the audio data stream is organized to project the address of prediction well in advance. Marking a location in the future bitstream allows the decoder 120 to process ahead of current decoding, and to start memory fetches of prediction clips before that section of bit stream syntax has been decoded. The projecting may be achieved by utilizing markers, for example, startcode words, within the stream that may be readily identified. Projecting may also be achieved by using a pointer list at the start of a frame, which indicates where all the memory address information is located within the frame. These schemes may be utilized for syntax that may be backward compatible with previous generations of syntax, but may be less efficient than pipelining the location in advance of when it is needed. Although it takes additional overhead bits to transmit the projection address in the bit stream, pipelining the location in advance does not require such overhead bits.

Figure 11:
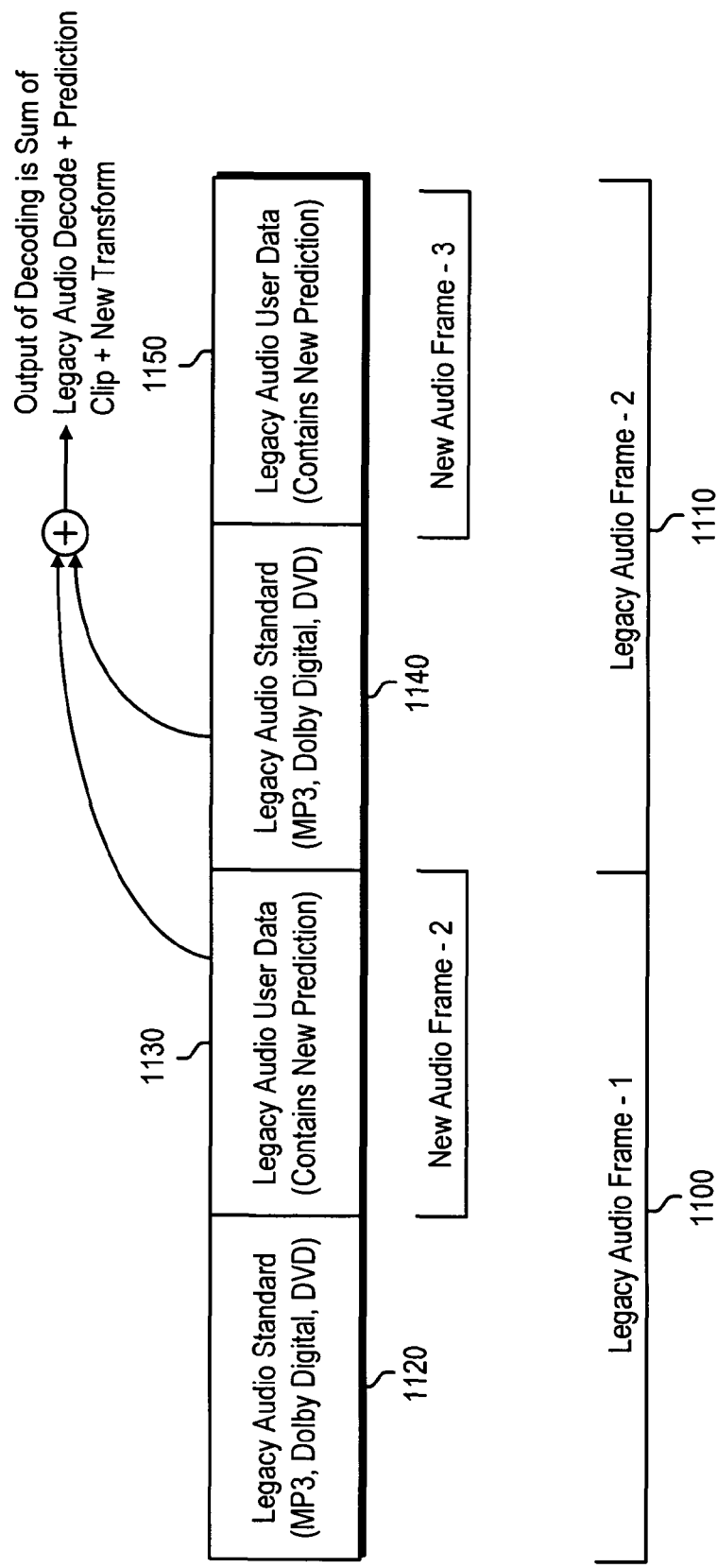
FIG. 11 is a diagram illustrating exemplary projection and use of pipelining for compatibility with legacy systems, which may be utilized in connection with memory usage in real-time audio processing systems, in accordance with an embodiment of the invention.

FIG. 11 is a diagram illustrating exemplary projection and use of pipelining for compatibility with legacy systems, which may be utilized in connection with memory usage in real-time audio processing systems, in accordance with an embodiment of the invention. According to this illustrative embodiment, in a system that requires backward compatibility, data related to a new standard, such as prediction data, is included in the user data section of the legacy audio frame. FIG. 11 shows two legacy audio frames 1100 and 1110. Legacy audio frame 1100 includes a legacy data block 1120 containing data pertaining to the legacy standard (such as MP3#, dolby digital, or DVD, for example) and a user data block 1130. According to the present invention, data related to a new standard, such as prediction data, is included in the user data block 1130 of the legacy audio frame 1100. Similarly, new standard data corresponding to a second audio frame is included in the user data block 1150 of the legacy audio frame 1110. A legacy decoder decodes the old standard and receive a lower quality of audio. A new decoder decodes the new standard and adds it to the decoded legacy standard data to get higher quality audio. The addition may be direct, or it may involve upsampling the "old" data prior to adding the "new" standard data. Upsampling allows a new decoder to process old data at 48 Khz, convert to 96 Khz, and add new information that improves quality from 48 Khz to 96 Khz.

According to an embodiment of the present invention, in a legacy system where memory latency and burst length are an issue, the syntax is defined such that all the new information (tables, prediction, etc.) is placed in the frame prior to the summation frame. Thus in FIG. 11, the new standard data corresponding to legacy audio frame 1110 is placed in the user data block 1130 of legacy audio frame 1100. This allows the new decoder to fetch from memory well in advance of when the data is needed for summation. In such a system, error recovery and channel change would take at most 2 frame times. Such pipelining gives the "new" format decoder one frame time to fetch from memory and decode the new format.

Figure 12:
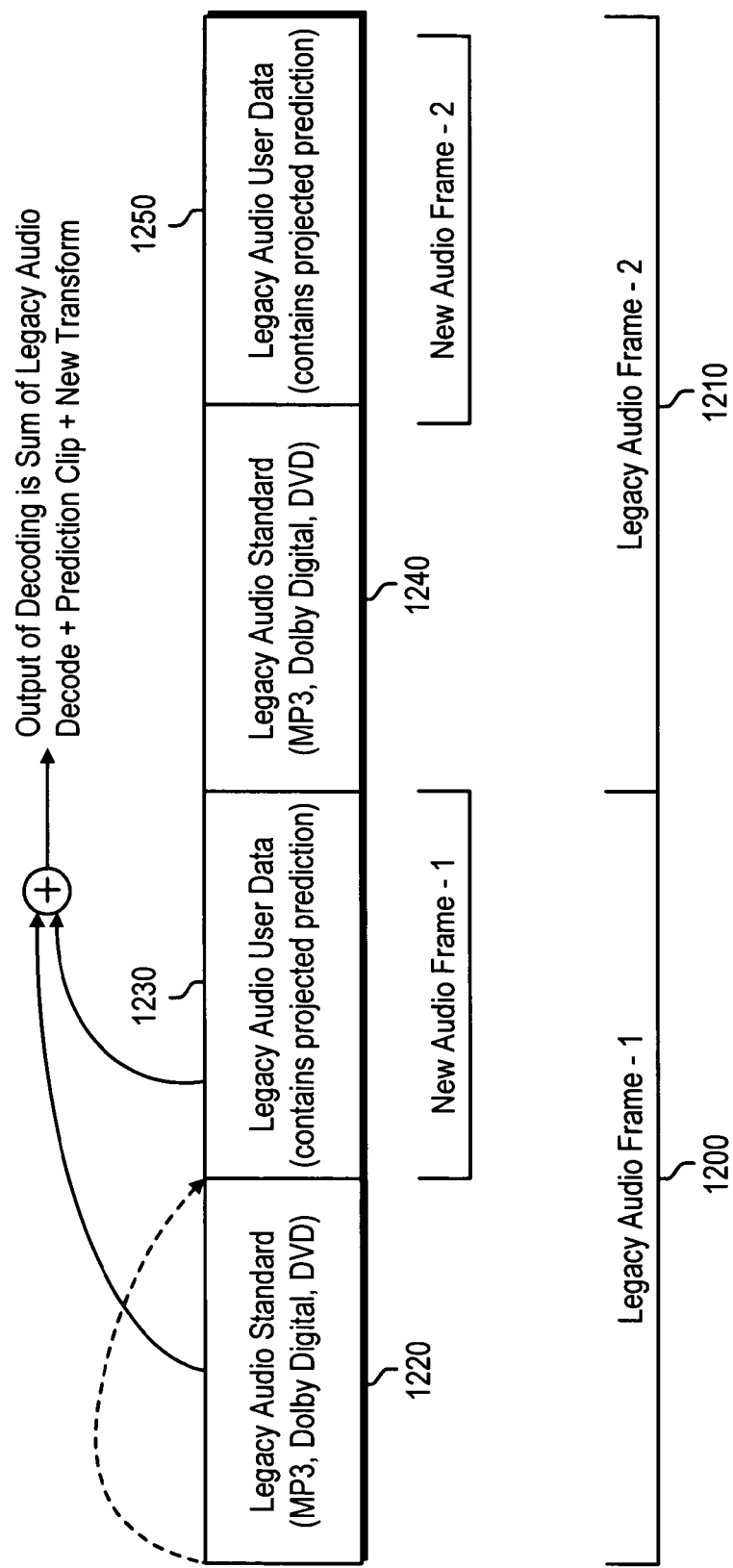
FIG. 12 is a diagram illustrating exemplary projection and use of pipelining for compatibility with legacy systems, which may be utilized in connection with memory usage in real-time audio processing systems, in accordance with an embodiment of the invention.

FIG. 12 is a diagram illustrating exemplary projection and use of pipelining for compatibility with legacy systems, which may be utilized in connection with memory usage in real-time audio processing systems, in accordance with an embodiment of the invention. FIG. 12 illustrates an alternative way to pipeline syntax in legacy audio streams. FIG. 12 shows two legacy audio frames 1200 and 1210. Legacy audio frame 1200 includes a legacy data block 1220 containing data pertaining to the legacy standard (such as MP3#, dolby digital, or DVD, for example) and a user data block 1230. Legacy audio frame 1210 includes a legacy data block 1240 containing data pertaining to the legacy standard (such as MP3#, dolby digital, or DVD, for example) and a user data block 1250. According to the present invention, data related to a new standard, such as prediction data, is included in the user data blocks 1230 and 1250 of the legacy audio frames 1200 and 1210. If the user data start location is known at the beginning of the frame, the "new" decoder uses this start location as a projection into the future syntax and goes to this location (1230) and immediately starts decoding the new format audio, while in parallel decoding the legacy format audio frame 1220. This allows memory transactions for "new" frame-1 (1230) to happen in parallel with legacy frame-1 (1220). It is noted that most legacy syntax provides a pointer to the user data. This pointer can be used to project the location of future data in the bitstream that contains "new" audio data. The decoder output is the sum of legacy frame-1 (1220) and new frame-1 (1230).

Figure 13:
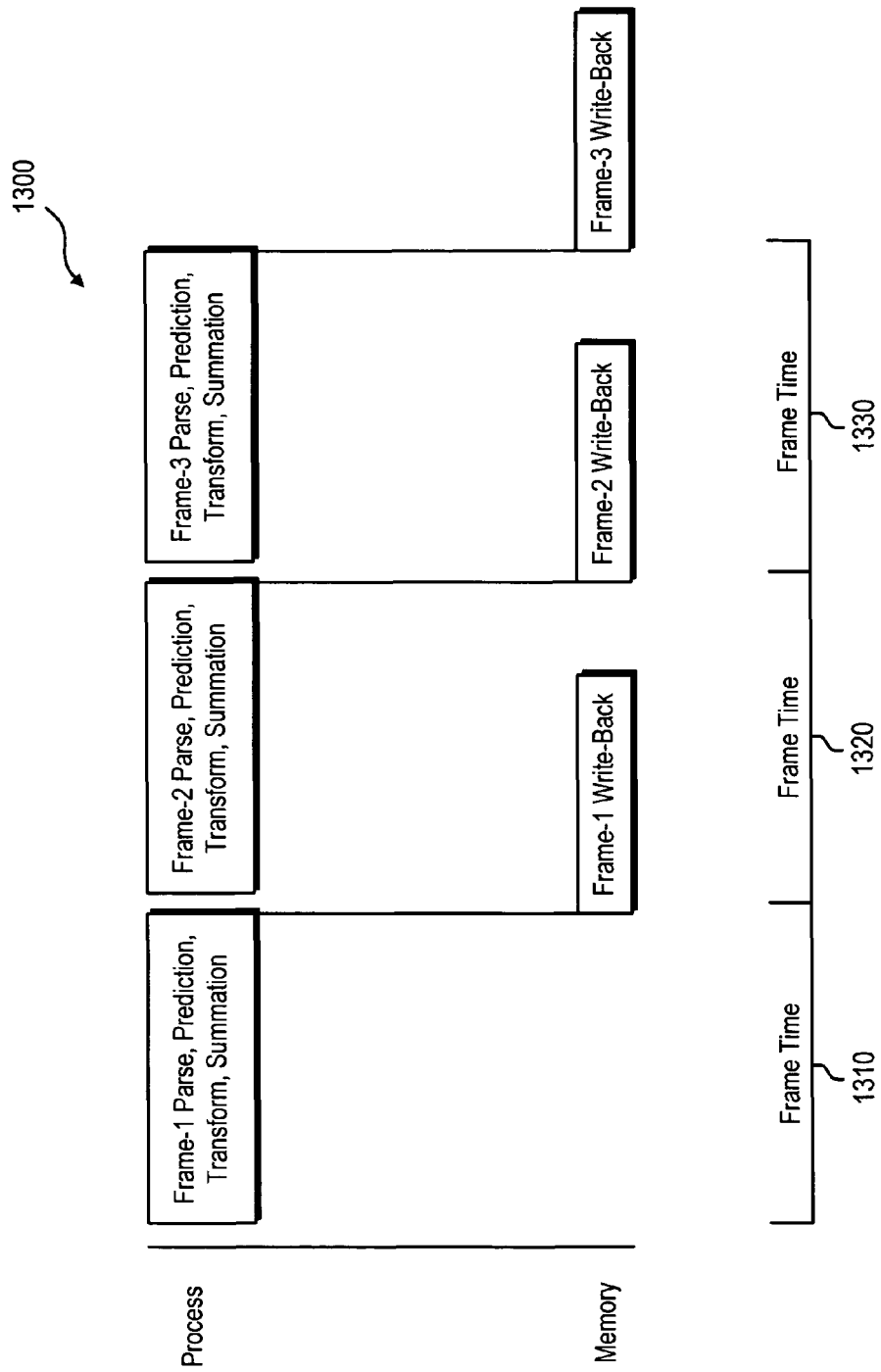
FIG. 13 is a diagram illustrating a decoding pipeline demonstrating write-back delay, which may be utilized in connection with memory usage in real-time audio processing systems, in accordance with an embodiment of the invention.

Write-back delay may be an issue for any system that relies upon pipelining and prediction. A decoder such as decoder 120 takes some time to decode a frame and takes some time to write a frame back to memory. DRAM latency may affect both reads and writes. According to the present invention, the bitstream syntax allows for some time for an ideal decoder to process a stream and write the audio samples to memory before allowing the audio samples to be utilized for prediction. FIG. 13 is a diagram illustrating a decoding pipeline demonstrating write-back delay, which may be utilized in connection with memory usage in real-time audio processing systems, in accordance with an embodiment of the invention. FIG. 13 shows a decoding pipeline wherein during frame time 1310, the decoder 120 performs parsing, prediction, transform and summation for frame-1. The decoded frame-1 is not written back to DRAM until well into frame time 1320. The decoder 120 performs parsing, prediction, transform and summation for frame-2 during frame time 1320. The decoded frame-2 is not written back to DRAM until well into frame time 1330.

In any real system, the process of audio decoding will consume some amount of time. If the decode does not finish within a frame time, it can be seen that the decoder will fall behind and never catch up. In a system with no economic limits, decoding can be done infinitely fast. Real systems with real limits on speed, memory and gates will optimize to decode just barely fast enough and no faster. The effect of pipelining does not relieve the reality of single frame decode time, it simply allows more hardware to work together on the problem. Keeping in mind that there is only one DRAM interface that must perform prediction and write-back, a data hazard can be seen in FIG. 13: Frame-1 write-back is not available in memory until after Frame-2 starts processing. According to an illustrative embodiment of the present invention, all frames are restricted from predicting from the previous 1 frame. This allows shallow pipelined decoders to process without data hazards.

Figure 14:
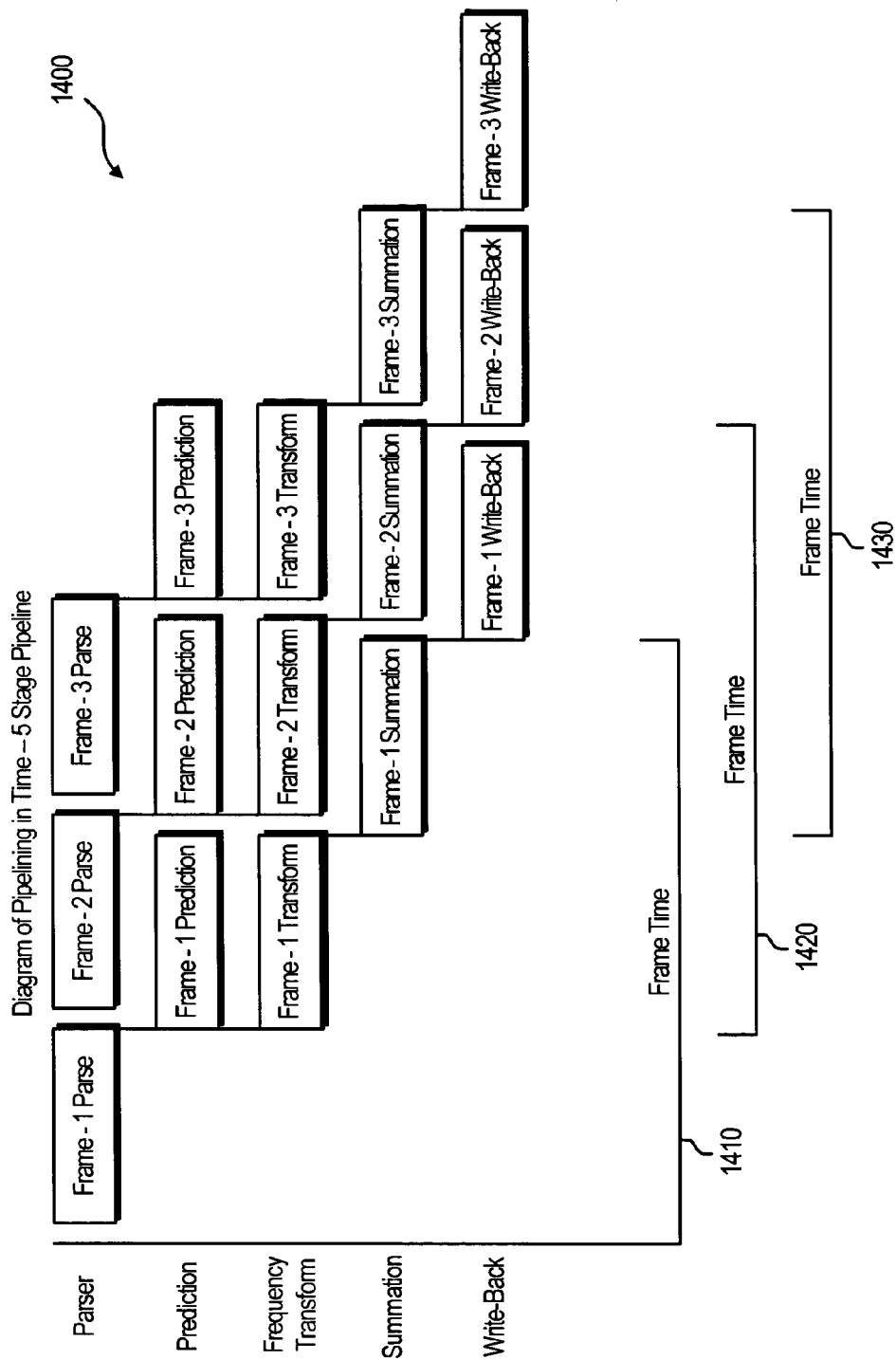
FIG. 14 is a diagram illustrating a decoding pipeline in a deeply pipelined system demonstrating write-back delay, which may be utilized in connection with memory usage in real-time audio processing systems, in accordance with an embodiment of the invention.

FIG. 14 is a diagram illustrating a decoding pipeline in a deeply pipelined system demonstrating write-back delay, which may be utilized in connection with memory usage in real-time audio processing systems, in accordance with an embodiment of the invention. FIG. 14 shows a decoding pipeline wherein during frame time 1410, the decoder 120 performs parsing for frame-1. After frame-1 is parsed, the decoder 120 performs prediction and transform for frame-1, while at about the same time, the decoder parses frame-2. When the prediction and transform operations are completed for frame-1, the decoder 120 performs summation for frame-1, while at about the same time, the decoder 120 performs transform and prediction operations for frame-2 and parses frame-3. The decoded frame-1 is not written back to DRAM until nearly the end of frame time 1420. Similarly, the decoded frame-2 is not written back to DRAM until nearly the end of frame time 1430. In this deeply pipelined system, Frame-1 write-back is not available in memory until after Frame-3 starts processing. Therefore, the prediction of Frame-3 should not predict from Frame-1. The bitstream syntax of the present invention is designed to accommodate such delays. According to an illustrative embodiment of the present invention, in a deeply pipelined system, all frames are restricted in syntax from predicting from the previous 2 frames. This allows deeply pipelined decoders to process without data hazards.

Figure 15:
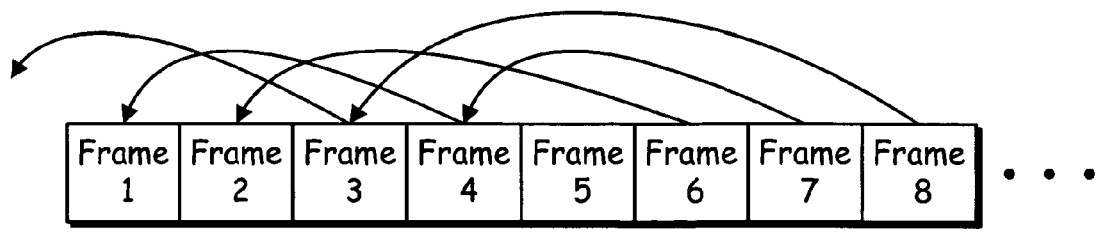
FIG. 15 is a diagram illustrating syntax restriction, which may be utilized in connection with memory usage in real-time audio processing systems, in accordance with an embodiment of the invention.

FIG. 15 is a diagram illustrating syntax restriction, which may be utilized in connection with memory usage in real-time audio processing systems, in accordance with an embodiment of the invention. FIG. 15 shows that no frame is predicted from its previous two neighbors.

In another aspect of the present invention, audio prediction is improved by allowing the audio syntax to predict audio clips from previous audio frames, and from other channels within previous audio frames. In a 6-channel audio system, there is a high correlation between channels and allowing one audio channel to predict from another audio channel may reduce the bit rate and increase compression efficiency.

Figure 16:
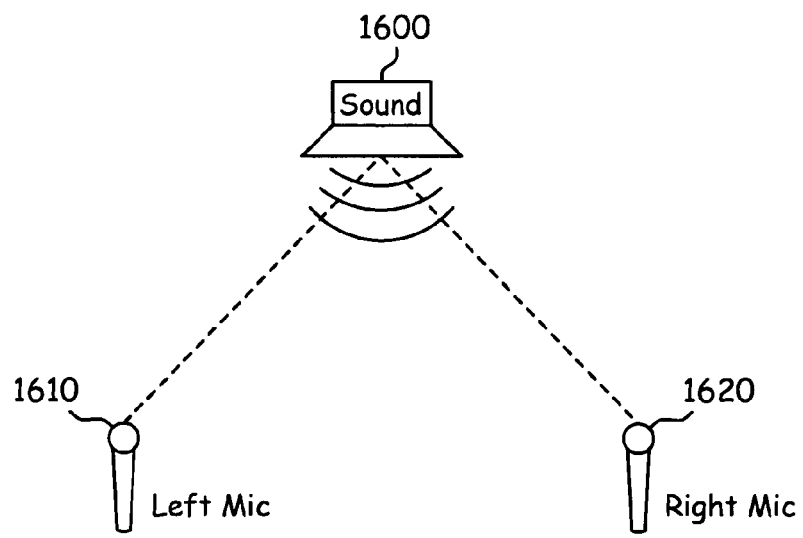
FIG. 16 is a functional block diagram representing an audio source giving rise to a phase difference between channels.
Figure 17:
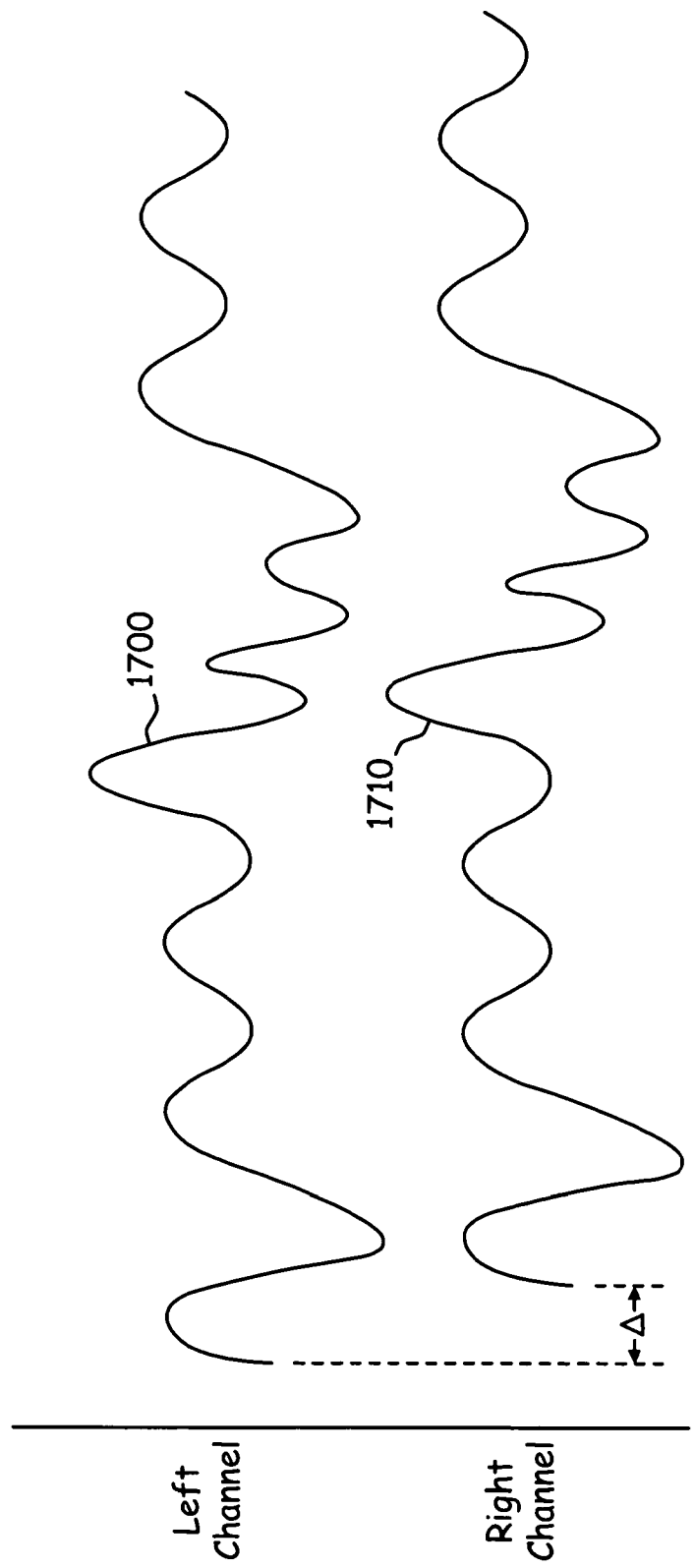
FIG. 17 is a diagram illustrating an exemplary phase shift across channels, which may be utilized in connection with memory usage in real-time audio processing systems, in accordance with an embodiment of the invention.
Figure 18:
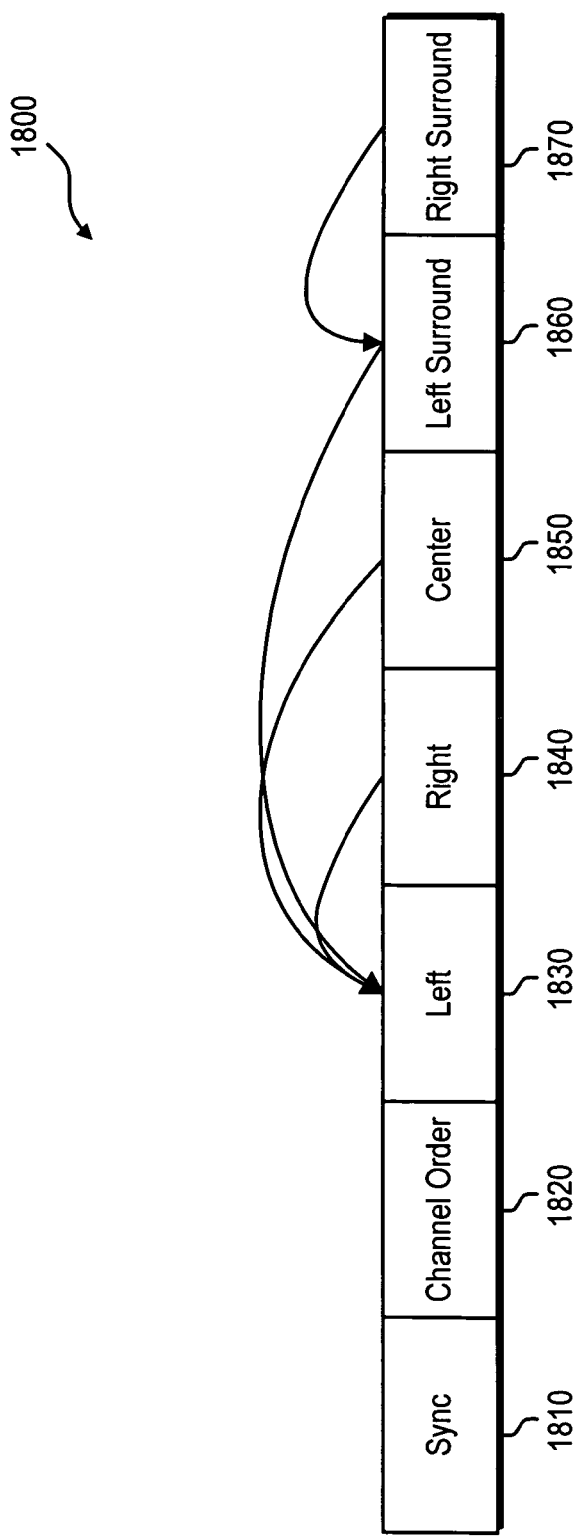
FIG. 18 is a diagram illustrating exemplary intra-frame prediction across channels, which may be utilized in connection with memory usage in real-time audio processing systems, in accordance with an embodiment of the invention.

In an illustrative embodiment of the present invention, audio prediction is further improved by allowing the audio system to provide high-precision polyphase sub-sample prediction. A small time shift of audio during prediction may be accomplished utilizing, for example, Lagrange interpolation, Farrow structure filters, and/or high-precision finite impulse response (FIR) filters. These filters may be adapted to allow an audio sample to be phase adjusted by very fine or small increments, for example, up to thousands of phases per sample. Fine resampling of audio phase is important, as most stereo systems receive essentially the same information in the left (L) and right (R) channels. However there is usually a phase difference between the left and right channel. FIG. 16 is a functional block diagram representing an audio source 1600 giving rise to a phase difference between channels representing the left microphone 1610 and right microphone 1620. As the source moves left-stage or right stage, the sound arrives at a listener's left and right ears at a slightly different time. FIG. 17 is a diagram illustrating an exemplary phase shift across channels, which may be utilized in connection with memory usage in real-time audio processing systems, in accordance with an embodiment of the invention. FIG. 17 shows a left channel audio signal 1700 and a right channel audio signal 1710 wherein the two signals are substantially identical except for a phase shift $\Delta$. High precision phase adjustment with prediction greatly improves audio compression by allowing the left channel of audio to predict from the right channel of audio or Left-center, or Right-Left, or Right-Center, for example. According to the present invention, this may be accomplished with prediction from past frames of audio, and/or with prediction from opposite channel audio within the current frame. FIG. 18 is a diagram illustrating exemplary intra-frame prediction across channels, which may be utilized in connection with memory usage in real-time audio processing systems, in accordance with an embodiment of the invention. FIG. 18 shows an audio frame 1800 including a synchronization header 1810, a channel order indicator 1820, and audio data for a left channel 1830, right channel 1840, center channel 1850, left surround channel 1860 and right surround channel 1870. In order to accomplish the prediction from opposite channel audio within the current frame, the order of audio decode is pipelined, so that the prediction channel is decoded first, and the predicted channel is coded later. Channel order indicator 1820 indicates the order in which the channels are to be decoded. FIG. 18 shows the right channel 1840, center channel 1850 and left surround channel 1860 utilizing prediction based on left channel 1830, and also shows right surround channel 1870 utilizing prediction based on left surround channel 1860. As may be typical of pipelining, the longer the time between decoding channels, the more efficient the memory accesses and pipelining that may be made. Cross-channel prediction may be done in any order to allow the encoder to optimize channels that may have high correlation in time. Cross-channel prediction may be enabled by audio syntax that allows variable channel decode order. Any channel may be decoded in any order within a frame.

The reordering of frames and pipelining for decoding may place various demands on an audio processing system by requiring audio data to be properly ordered and re-aligned prior to being output from a decoder. This almost certainly requires that the decoder store some channels in memory, while it is still decoding other channels. If the amount of data is small, this re-ordering may be done on-chip. However, according to an embodiment of the present invention, if the frames are large, the reordering is done in DRAM 130. The re-ordering in DRAM involves further writes of the decoded output to a DRAM output buffer. In an illustrative embodiment, the re-ordered data is fed from the DRAM output buffer to an output DAC 140 and subsequently to one or more speakers. In one embodiment, the output buffer is written in large chunks from the decoder transform, and read in small chunks to output to the DAC 140. In accordance with an alternative embodiment of the invention, a more efficient design is to read data in large chunks from the DRAM 130 into small on-chip buffers that store data for the DAC output, while taking advantage of the higher efficiency of large DRAM bursts.

Figure 19:
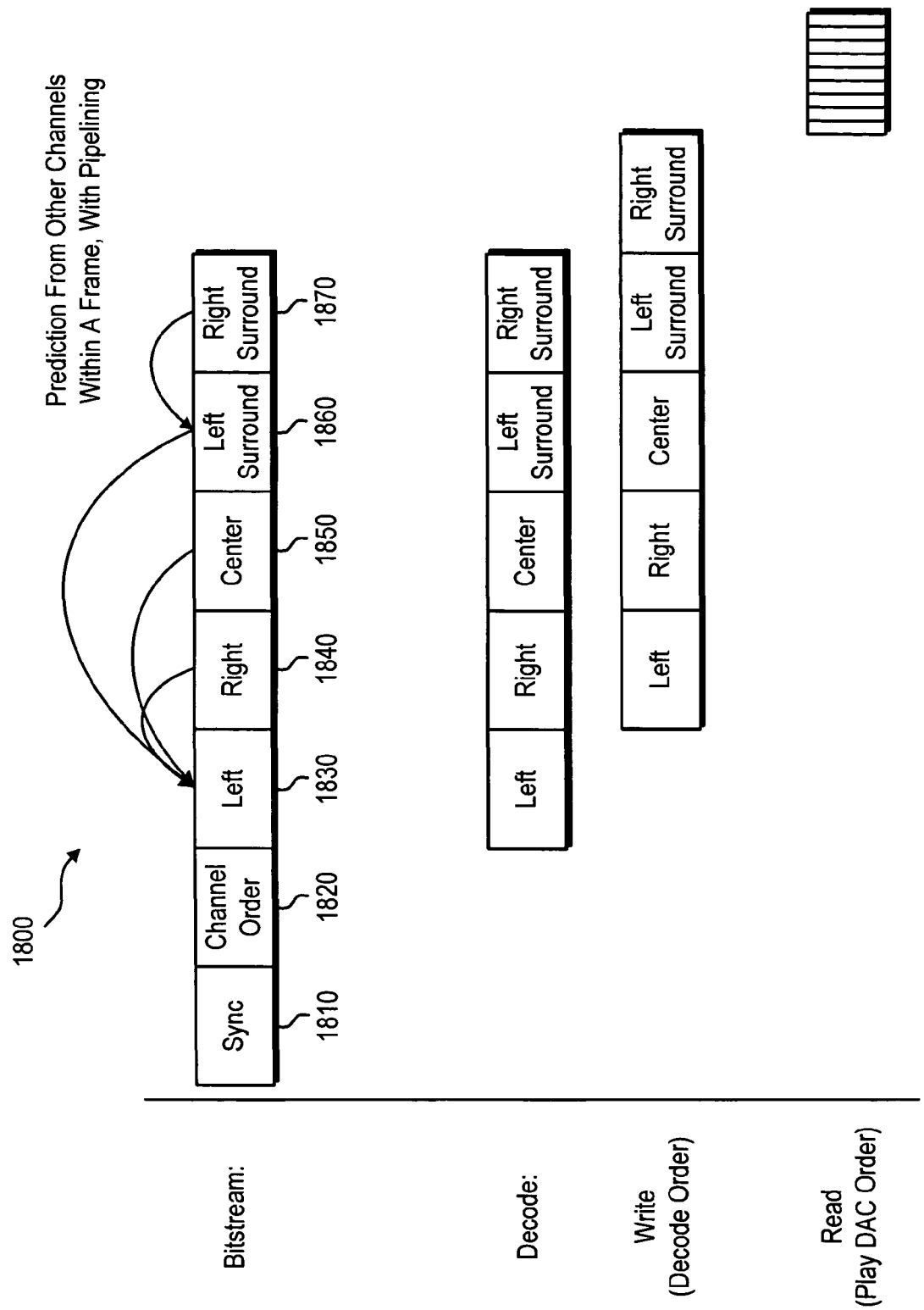
FIG. 19 is a diagram illustrating exemplary write-back reordering after intra-frame prediction, which may be utilized in connection with memory usage in real-time audio processing systems, in accordance with an embodiment of the invention.

FIG. 19 is a diagram illustrating exemplary write-back reordering after intra-frame prediction, which may be utilized in connection with memory usage in real-time audio processing systems, in accordance with an embodiment of the invention. FIG. 19 shows an audio frame 1800, as shown in FIG. 18, including a synchronization header 1810, a channel order indicator 1820, and audio data for a left channel 1830, right channel 1840, center channel 1850, left surround channel 1860 and right surround channel 1870. FIG. 19 shows the right channel 1840, center channel 1850 and left surround channel 1860 utilizing prediction based on left channel 1830, and also shows right surround channel 1870 utilizing prediction based on left surround channel 1860. FIG. 19 also shows the pipelining of the decoding functions and the writing of the decoded data back to memory. Note that in this system, it may be nearly impossible to decode the left channel, store to memory, then decode the right channel with prediction from the left channel. Utilizing DRAM 130 in such a high-demand, low-latency algorithm is very inefficient. In an illustrative embodiment, the cost of such a system is kept low by making the channel information small and utilizing on-chip memory to store the previous channels within a frame.

In an alternative embodiment of the invention, only one channel is allowed to be the prediction source, thereby needing only one channel's worth of on-chip storage, and all intra-frame prediction is limited to using only one channel as a source.

Reordering audio data decoded in large blocks can be expensive using on-chip memory. However, if combined with other techniques in this invention, reordering in DRAM can be cost effective. According to an embodiment of the invention, data is written to DRAM 140 as it is decoded, that is, in channel order. The decoded data needs to be presented to the DAC in sample order, i.e., all channels simultaneously. According to an embodiment of the present invention, a variable reorder function is implemented in which channels of data are stored to DRAM in the order they are decoded, and are read out in the order of presentation, that is, in parallel. In an illustrative embodiment, the read efficiency is improved by reading moderate-sized bursts form each channel in DRAM and utilizing some small on-chip buffer for burst-rate management.

In embodiments that utilize bitstream reordering and decoding of large chunks of data with prediction, the system allows for enough decoder latency to allow the write to DRAM for reorder and output buffering and allows for latency for read-buffering for output to a DAC. In one embodiment, if the audio frame has presentation time stamp information, it will allow that a real decoder will take no longer than 1 frame time through a decoder, through the re-order buffer and out to the DAC. This needs to be accounted for in the audio decoder delay between a hardware decoder and a stereo receiver which may receive data that has been re-transmitted on an SPDIF, 1394, or other connection.

By including functions such as pipelining into the bit stream, allowing for real decode latency, and restricting bit stream syntax to elements that may be decoded in pipelined hardware, the overall system cost of audio design may be significantly lower. Additionally, this will allow the audio decoder to be integrated into high-complexity systems that include CPU, graphics, video, Ethernet, and other functionality and still share a DRAM efficiently.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of transmitting media data, comprising:
determining, with a processing circuit, a difference value between a first media clip and a previous media clip;
transmitting a reference to a group of codes for decoding;
transmitting a reference to the previous media clip; and
after transmitting the reference to the group of codes for decoding and the reference to the previous media clip, transmitting the difference value.

2. The method of claim 1 wherein:
the reference to the group of codes for decoding, the reference to the previous media clip, and the difference value are transmitted in a media data frame; and
the reference to the group of codes for decoding and the reference to the previous media clip are positioned ahead of the difference value in the frame.

3. The method of claim 1 wherein:
the reference to the previous media clip is transmitted in a first media data frame and the difference value is transmitted in a second media data frame; and
the first frame is transmitted before the second frame.

4. The method of claim 1 wherein the first media clip and the previous media clip comprise clips of audio data.

5. A method of decoding media data, comprising:
receiving a reference to a group of codes for decoding;
receiving a reference to a previous media clip;
retrieving data corresponding to the group of codes for decoding from memory;
retrieving data corresponding to the previous media clip from the memory;

after receiving the reference to the group of codes for decoding and the reference to the previous media clip, receiving difference data corresponding to a first media clip;

decoding, with a processing circuit, the difference data into decoded difference data, at least a portion of the decoding occurring substantially in parallel with at least a portion of the retrieving data corresponding to the previous media clip; and adding the data corresponding to the previous media clip to the decoded difference data to produce a decoded value corresponding to the first media clip.

6. The method of claim 5 wherein:

the adding is performed by the processing circuit; and the memory from which the data corresponding to the previous media clip is retrieved comprises an external memory to the processing circuit.

7. The method of claim 6 wherein the external memory comprises DRAM.

8. The method of claim 5 wherein the first media clip and the previous media clip comprise clips of audio data.

9. The method of claim 5 wherein the decoding comprises decoding the difference data into the decoded difference data using the data corresponding to the group of codes for decoding.

10. A method of transmitting audio data, comprising:

determining, with a processing circuit, a difference value between a first audio clip of a first audio channel and a previous audio clip of a second audio channel;

transmitting a reference to a group of codes for decoding;

transmitting a reference to the previous audio clip of the second audio channel; and transmitting the difference value.

11. A method of decoding a first audio clip of a first audio channel, comprising:

receiving a reference to a group of codes for decoding;

receiving a reference to a previous audio clip of a second audio channel;

receiving difference data indicating a difference value between a first audio clip of a first audio channel and the previous audio clip of the second audio channel;

retrieving data corresponding to the group of codes for decoding from memory;

retrieving data corresponding to the previous audio clip from the memory;

decoding, with a processing circuit, the difference data into decoded difference data; and adding the data corresponding to the previous audio clip to the decoded difference data to produce a decoded value corresponding to the first audio clip.

12. The method of claim 11 wherein the decoding comprises decoding the difference data into the decoded difference data using the data corresponding to the group of codes for decoding.

13. The method of claim 11 wherein the first audio clip is received in a first audio data frame and the previous audio clip is received in a previous audio data frame.

14. A method of transmitting audio data, comprising:

determining, by a processing circuit, a difference value between a first audio clip of a first audio channel and a second audio clip of a second audio channel, the first and second audio clips being part of a single audio data frame;

transmitting a reference to a group of codes for decoding;

transmitting a reference to the second audio clip of the second audio channel; and transmitting the difference value.

15. A method of decoding a first audio clip of a first audio channel, comprising:

receiving a reference to a group of codes for decoding;

receiving a reference to a second audio clip of a second audio channel, the first and second audio clips being part of a single audio data frame;

receiving difference data indicating a difference value between the first audio clip and the second audio clip;

retrieving data corresponding to the group of codes for decoding from memory;

retrieving data corresponding to the second audio clip from the memory;

decoding, with a processing circuit, the difference data into decoded difference data; and adding the data corresponding to the second audio clip to the decoded difference data to produce a decoded value corresponding to the first audio clip.

16. The method of claim 15 wherein the decoding comprises decoding the difference data into the decoded difference data using the data corresponding to the group of codes for decoding.

\* \* \* \* \*